(12) United States Patent
Zong et al.

(10) Patent No.: US 12,068,915 B1
(45) Date of Patent: Aug. 20, 2024

(54) SWITCH CONFIGURATION MANAGEMENT METHOD AND APPARATUS, AND ELECTRONIC DEVICE AND STORAGE MEDIUM

(71) Applicant: SUZHOU METABRAIN INTELLIGENT TECHNOLOGY CO., LTD., Jiangsu (CN)

(72) Inventors: Dongrui Zong, Jiangsu (CN); Weisong Guo, Jiangsu (CN)

(73) Assignee: SUZHOU METABRAIN INTELLIGENT TECHNOLOGY CO., LTD., Jiangsu (CN)

(*) Notice: Subject to any disclaimer, the term of this patent is extended or adjusted under 35 U.S.C. 154(b) by 0 days.

(21) Appl. No.: 18/696,391

(22) PCT Filed: Dec. 23, 2022

(86) PCT No.: PCT/CN2022/141664
§ 371 (c)(1),
(2) Date: Mar. 28, 2024

(87) PCT Pub. No.: WO2023/160203
PCT Pub. Date: Aug. 31, 2023

(30) Foreign Application Priority Data

Feb. 23, 2022 (CN) .......................... 202210165556.0

(51) Int. Cl.
*H04L 41/0816* (2022.01)
*H04L 41/0659* (2022.01)
*H04L 41/0873* (2022.01)

(52) U.S. Cl.
CPC ...... *H04L 41/0816* (2013.01); *H04L 41/0661* (2023.05); *H04L 41/0873* (2013.01)

(58) Field of Classification Search
None
See application file for complete search history.

(56) References Cited

U.S. PATENT DOCUMENTS

| | | | |
|---|---|---|---|
| 2004/0133573 A1* | 7/2004 | Miloushev | G06F 16/10 |
| 2004/0133650 A1* | 7/2004 | Miloushev | H04L 69/22 709/213 |

(Continued)

FOREIGN PATENT DOCUMENTS

| | | |
|---|---|---|
| CN | 104734877 A | 6/2015 |
| CN | 105897624 A | 8/2016 |

(Continued)

OTHER PUBLICATIONS

Bao Wenjun, et al. "Online configuration management of GOOSE switch in intelligent substation." Electronic Technology and Software Engineering. Apr. 25, 2018.

(Continued)

*Primary Examiner* — Kenny S Lin
(74) *Attorney, Agent, or Firm* — IPro, PLLC

(57) ABSTRACT

A method and an apparatus for managing switch configuration, an electronic device and a storage medium are provided. The method includes: selecting one interface from a plurality of interfaces of a switch as a working interface to perform a lock obtaining operation to generate an operation result; performing a control operation based on the operation result, wherein the control operation includes controlling the switch to obtain a configuration file from a server through the working interface; and after it is confirmed that the switch completes obtaining the configuration file, determining whether the switch is normally started, and determining a processing action based on a determining result.

20 Claims, 4 Drawing Sheets

(56) References Cited

U.S. PATENT DOCUMENTS

2004/0133652 A1* 7/2004 Miloushev .......... H04L 67/1019
707/999.009
2019/0036942 A1 1/2019 Isola
2023/0353506 A1* 11/2023 Khan .................... H04L 49/354

FOREIGN PATENT DOCUMENTS

| | | | |
|---|---|---|---|
| CN | 109617813 A | | 4/2019 |
| CN | 111200524 A | | 5/2020 |
| CN | 111405004 A | | 7/2020 |
| CN | 112511379 A | | 3/2021 |
| CN | 112769602 A | | 5/2021 |
| CN | 114036164 A | * | 2/2022 |
| CN | 114244702 A | | 3/2022 |
| EP | 2191597 A1 | | 6/2010 |

OTHER PUBLICATIONS

Fu Chang. "The Design and Implementation of Aremote Configuration and Management System for Openflow Switches." A thesis for master degree. Beijing University of Posts and Telecommunications. Aug. 15, 2019.

Ming Yi. "Interface and Hardware Components Configuration Guide, Cisco IOS XE Gibraltar 16.10.x (Catalyst 9500 Switches)." Retrieved from https://www.cisco.com/c/en/us/td/docs/switches/lan/catalyst9500/software/release/16-10/configuration_guide/int_hw/b_1610_int_and_hw_9500_cg/configuring_ethernet_managment_port.html. Nov. 15, 2018.

* cited by examiner

SWITCH CONFIGURATION MANAGEMENT METHOD AND APPARATUS, AND ELECTRONIC DEVICE AND STORAGE MEDIUM

CROSS-REFERENCE TO RELATED APPLICATION

This application claims the priority of the Chinese Patent application filed on Feb. 23, 2022 before the China National Intellectual Property Administration with the application number of 202210165556.0, and the title of "SWITCH CONFIGURATION MANAGEMENT METHOD AND APPARATUS, AND ELECTRONIC DEVICE AND STORAGE MEDIUM", which is incorporated herein in its entirety by reference.

FIELD

The present application relates to the field of configuration management and, more particularly, to a method and an apparatus for managing switch configuration, an electronic device and a storage medium.

BACKGROUND

In the field of conventional configuration management, when a switch needs to be configured, if the switch is located in a complex network environment, for example, the switch is connected to a plurality of network segments, because each interface of the switch may correspond to one network segment, when a plurality of interfaces simultaneously send configuration requests to a server, the server may be busy in short time, and the switch may obtain a wrong configuration file and cannot be normally started.

A dynamic host configuration protocol version 6 (DHCPv6)-based server may be taken as an example. A configuration provided by the DHCPv6-based server is stateful and stateless. A stateful address is allocated by the server in a unified manner, the address is controllable, and all types of option information may be issued. A stateless address is generated by the switch itself, and includes prefix information, and a default route for a network segment may be generated. When the switch is connected to a plurality of IPv6 network segments, and each interface is requesting to work, it may be caused that the switch cannot obtain a correct configuration from the server for running.

SUMMARY

An object of the present application is to overcome shortcomings in the prior art, and provide a method and an apparatus for managing switch configuration, an electronic device and a storage medium, to reduce working pressure of a server and ensure that a switch obtains a correct configuration file and is normally started. Solutions are as follows.

In some embodiments, a method for managing switch configuration is provided, applied to a configuration management apparatus, wherein the method includes:
selecting one interface from a plurality of interfaces of a switch as a working interface to perform a lock obtaining operation to generate an operation result;
performing a control operation based on the operation result, wherein the control operation includes controlling the switch to obtain a configuration file from a server through the working interface; and
after it is confirmed that the switch completes obtaining the configuration file, determining whether the switch is normally started, and determining a processing action based on a determining result.

In some embodiments, the operation result includes a lock obtaining success and a lock obtaining failure, and selecting one interface from the plurality of interfaces of the switch as the working interface to perform the lock obtaining operation to generate the operation result includes:
detecting whether there is a lock file in the switch, and in response to there being not the lock file, writing a working interface number of the working interface to the lock file to generate a new lock file, and generating the operation result indicating the lock obtaining success; or
in response to there being the lock file, and a specified interface number in the lock file is the working interface number, generating the operation result indicating the lock obtaining success; or
in response to there being the lock file, and the specified interface number in the lock file is not the working interface number, generating the operation result indicating the lock obtaining failure.

In some embodiments, performing the control operation based on the operation result includes:
in response to the lock obtaining success, controlling the switch to obtain the configuration file from the server through the working interface; and
in response to the lock obtaining failure, selecting the specified interface corresponding to the specified interface number as the working interface to perform the lock obtaining operation.

In some embodiments, in response to controlling the switch to obtain the configuration file from the server through the working interface, the method further includes:
traversing the plurality of interfaces, banning another interface except the working interface in the plurality of interfaces from working, and deleting a default route corresponding to the another interface.

In some embodiments, after determining that a client completely obtains the configuration file from the server through a receiving interface, the method includes: in response to after completely obtaining the configuration file, the client being not normally started within a time range set by the user, labeling the receiving interface to be the invalid interface, reselecting the working interface to perform the lock obtaining operation.

In some embodiments, determining the processing action based on the determining result includes:
in response to the switch being not normally started, labeling the working interface as an invalid interface, performing a lock release operation on the working interface, and after all invalid interfaces are excluded, reselecting the working interface from the plurality of interfaces to perform the lock obtaining operation; and
in response to the switch being normally started, canceling labels of all the invalid interfaces, and performing the lock release operation on the working interface.

In some embodiments, in response to the switch being still not normally started within a time range set by a user, the labels of all the invalid interfaces are canceled.

In some embodiments, before selecting one interface from the plurality of interfaces of the switch as the working interface to perform the lock obtaining operation, the method further includes:
detecting information sent by the server to the switch, and in response to the information including a configuration starting instruction, starting to select one interface from the plurality of interfaces as the working interface to perform the lock obtaining operation.

In some embodiments, an apparatus for managing switch configuration is provided, applied to a configuration management apparatus, wherein the apparatus includes:
- a selection module 401, configured to select one interface from a plurality of interfaces of a switch as a working interface to perform a lock obtaining operation to generate an operation result;
- an operation module 402, configured to perform a control operation based on the operation result, wherein the control operation includes controlling the switch to obtain a configuration file from a server through the working interface; and
- a management module 403, configured to, after it is confirmed that the switch completes obtaining the configuration file, determine whether the switch is normally started, and determine a processing action based on a determining result.

In some embodiments, an electronic device is provided, wherein the electronic device includes: one or more processors; and a memory associated with the one or more processors, wherein the memory is configured to store program instructions; and in response to the program instructions being read and executed by the one or more processors, the method stated above is performed.

In some embodiments, a non-transitory computer storage medium storing a computer program thereon is provided, wherein in response to the program being executed by a processor, the steps of the method stated above are implemented.

In the present application, the configuration management apparatus is configured to: when the switch located in a complex network environment, for example, connected to a plurality of network segments, needs to update a configuration, the plurality of interfaces of the switch simultaneously making requests to the server to work, enable the switch to obtain the correct configuration file through the working interface that successfully obtains a lock, and when it is determined that the switch completing updating the configuration is not normally started, exclude the invalid interface and reselect the working interface to perform the lock obtaining operation. Therefore, in the present application, functions of the switch that the configuration file is obtained from the server through the correct working interface that successfully obtains the lock and that the switch is ensured to be normally started are implemented, security and stability in configuration update are improved. In addition, the another interface is banned from working, so that working pressure of the server is reduced.

BRIEF DESCRIPTION OF THE DRAWINGS

In order to more clearly illustrate the technical solution of some embodiments in the present application, the drawings that need to be used in the description of the embodiments will be briefly introduced below. Obviously, the drawings in the following description are only some embodiments. For a person skilled in the art, other drawings may be obtained based on these drawings without paying creative work.

DETAILED DESCRIPTION

Figure 1:
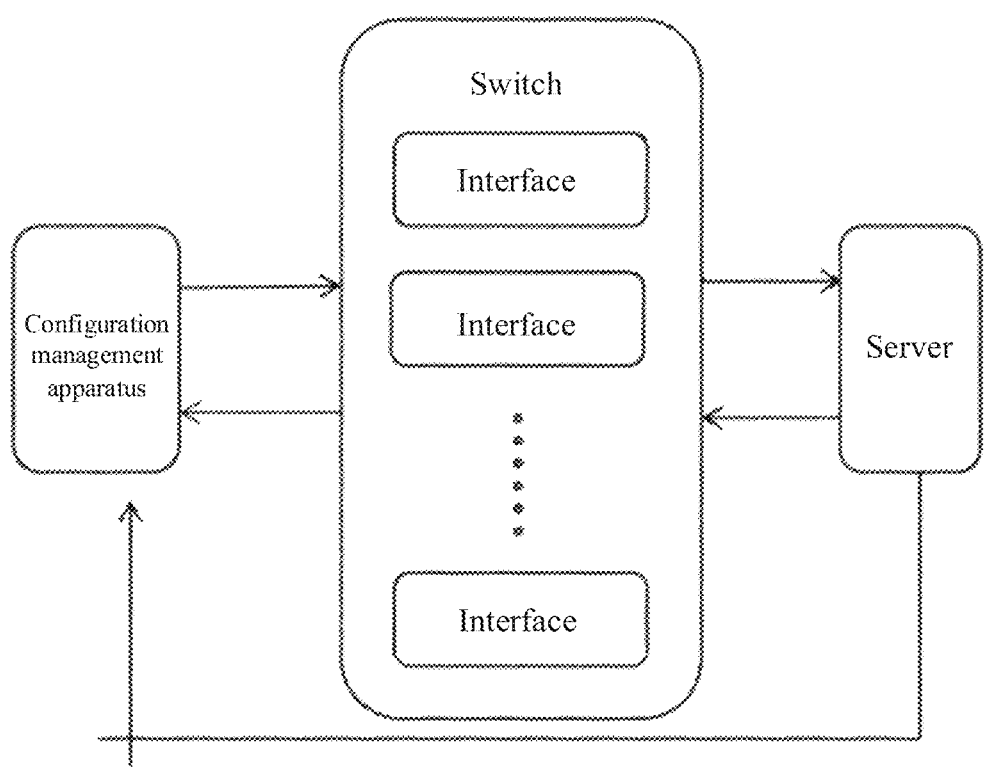
FIG. 1 is a diagram of a topological structure of a method for managing switch configuration.

For ease of understanding the present application, the following more completely describes the present application with reference to related accompanying drawings. The accompanying drawings show embodiments of the present application. However, the present application may be implemented in many different forms, and is not limited to embodiments described herein. Instead, the object that these embodiments are provided is for more thoroughly and completely understanding content disclosed in the present application.

Unless otherwise defined, all technical and scientific terms used in this specification have same meanings as those usually understood by a person skilled in the art of the present application. The terms used in the specification of the present application are merely for the purpose of describing embodiments, and are not intended to limit the present application. The term "and/or" used in this specification includes any and all combinations of one or more related listed items.

As mentioned in BACKGROUND, in the field of conventional configuration management, when a switch needs a configuration, if the switch is located in a complex network environment, for example, the switch is connected to a plurality of network segments, because each interface of the switch may correspond to one network segment, when a plurality of interfaces simultaneously send configuration requests to a server, the server may be busy in short time, and the switch may obtain a wrong configuration file and cannot be normally started. In the present application, a working interface that successfully obtains a lock is selected from the plurality of interfaces of the switch that needs to be configured, to obtain a correct configuration file. When it is determined that the switch completing updating the configuration cannot be normally started, an invalid interface is excluded, and the working interface is reselected to perform a lock obtaining operation. Therefore, in the present application, a function of the switch that the correct configuration file is obtained from the server during a configuration update is implemented, and a risk that the switch completing updating the configuration is not normally started is avoided. In addition, another interface is banned from working, so that working pressure of the server is reduced. A DHCPv6-based system is taken as an example below. The DHCPv6-based system includes a switch with a Linux system. Environmental preparations include: 1, a dynamic host configuration protocol (DHCP) server configures a correct Internet protocol version 6 (IPv6) address pool; 2, a boot file URL (boot file network address) that an option 59 (one of options about lease time in the DHCP) points to is normally accessible; and 3, DHCP clients are started on all the interfaces of the switch. A method and an apparatus for managing switch configuration, an electronic device and a storage medium in the present application are described in detail with reference to the accompanying drawings.

The method for managing switch configuration provided in the present application may be applied to an application environment shown in FIG. 1.

A server sends information to a switch. When the switch detects that the information carries a configuration starting instruction, a configuration management apparatus is prompted to be started. The configuration management apparatus selects a working interface from a plurality of interfaces of the switch, and controls the switch to obtain a configuration file from the server through the working interface. A user may perform parameter setting on the configuration management apparatus through the server.

Figure 2:
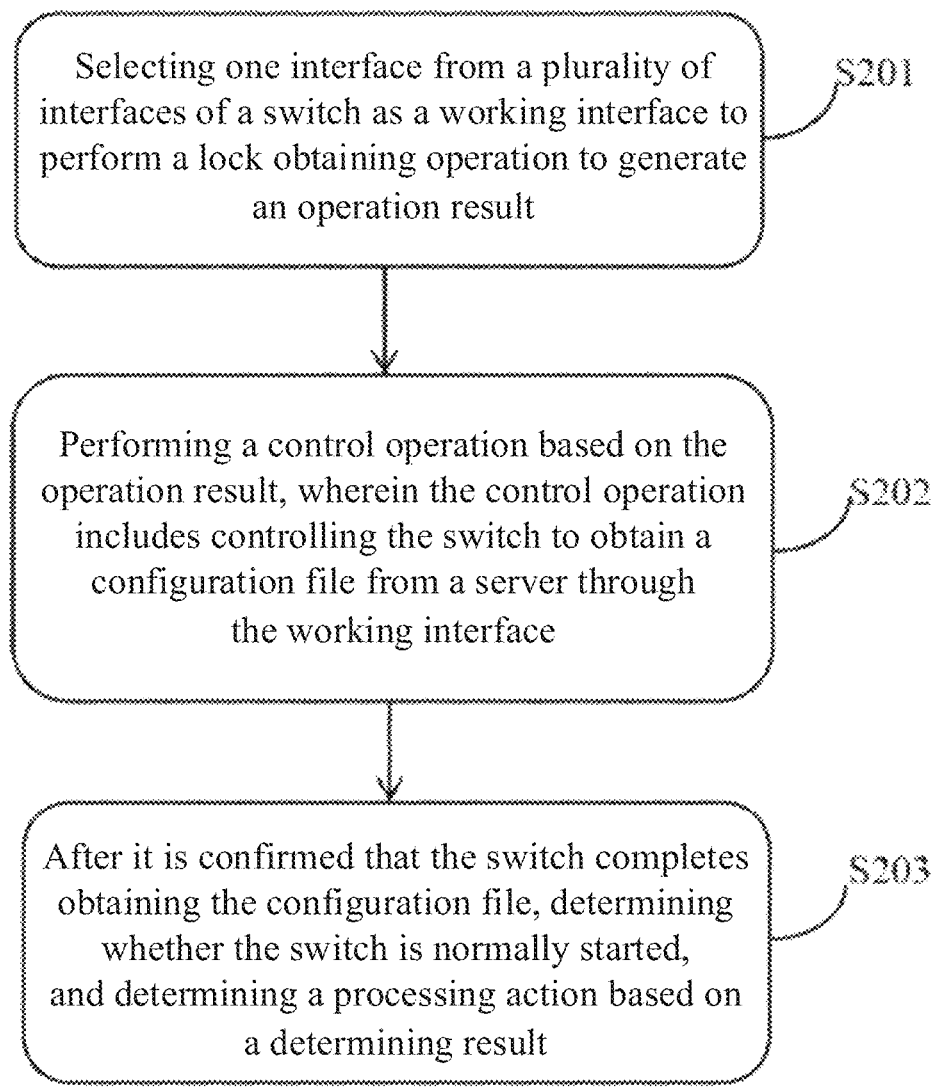
FIG. 2 is a schematic diagram of steps of a method for managing switch configuration.

As shown in FIG. 2, the present application provides the method for managing switch configuration, applied to the configuration management apparatus. The method includes:

S201: selecting one interface from a plurality of interfaces of a switch as a working interface to perform a lock obtaining operation to generate an operation result.

S202: performing a control operation based on the operation result, wherein the control operation includes controlling the switch to obtain a configuration file from a server through the working interface.

S203: after it is confirmed that the switch completes obtaining the configuration file, determining whether the switch is normally started, and determining a processing action based on a determining result.

In some embodiments of the present application, the configuration management apparatus selects, from the plurality of interfaces of the switch, the working interface that successfully obtains a lock, so that the switch obtains the configuration file from the server through the working interface. After the configuration file is completely obtained, whether the switch is normally started is checked to determine a subsequent processing action.

In some embodiments of the present application, when the plurality of interfaces of the switch request to work, by using this method, the configuration management apparatus enables the switch obtains a correct configuration file through the working interface that successfully obtains the lock, another interface is banned from working, and it is ensured that the switch is normally started. Busy task pressure of the server is reduced, and a possibility that the switch is not normally started is avoided.

In an embodiment, the operation result includes a lock obtaining success and a lock obtaining failure. Selecting one interface from the plurality of interfaces of the switch as the working interface to perform the lock obtaining operation to generate the operation result includes:

detecting whether there is a lock file in the switch, and when there is not the lock file, writing a working interface number of the working interface to the lock file to generate a new lock file, and generating the operation result indicating the lock obtaining success; or when there is the lock file, and a specified interface number in the lock file is the working interface number, generating the operation result indicating the lock obtaining success; or when there is the lock file, and the specified interface number in the lock file is not the working interface number, generating the operation result indicating the lock obtaining failure.

In some embodiments of the present application, the configuration management apparatus implements a lock obtaining function, wherein a parameter is an interface name. When there is the lock file in the switch and the specified interface number in the lock file is the working interface number, or there is not the lock file, the working interface certainly successfully implements the lock obtaining function. When the specified interface number in the lock file is not the selected working interface number, the working interface fails to implement the lock obtaining function, and the working interface needs to be reselected.

In the present application, the configuration management apparatus performs an operation of implementing the lock obtaining function, so that the switch may perform a read/write operation through only one interface. Therefore, a possibility of interference from another interface during obtaining of the configuration file by the switch is avoided.

Figure 3:
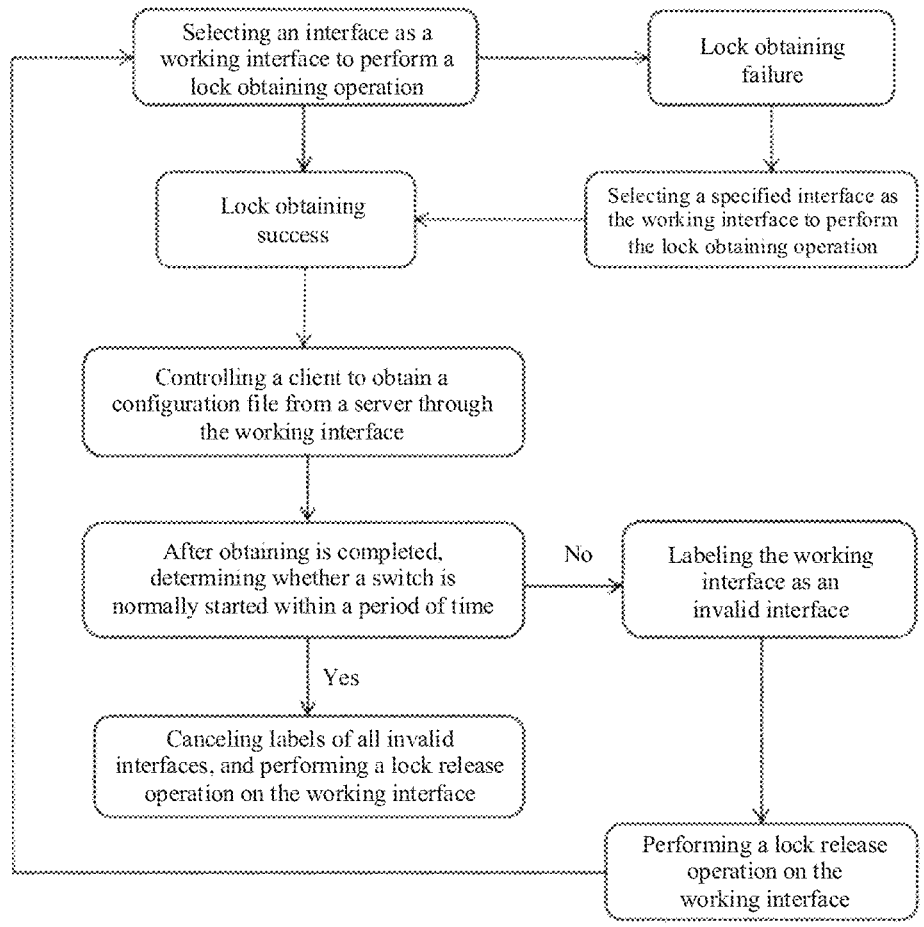
FIG. 3 is a schematic flowchart of a method for managing switch configuration.

In an embodiment, as shown in FIG. 3, performing a control operation based on the operation result includes:

in response to the lock obtaining success, controlling the switch to obtain the configuration file from the server through the working interface; or in response to the lock obtaining failure, selecting the specified interface corresponding to the specified interface number as the working interface to perform the lock obtaining operation.

In some embodiments of the present application, the configuration management apparatus performs a lock obtaining function operation on the working interface. If the lock obtaining function is successfully implemented, the configuration management apparatus controls the switch to start a configuration update; or if the lock obtaining function fails to be implemented, the lock obtaining function is implemented on the specified interface of the switch in the lock file.

In the present application, the configuration management apparatus enables the switch to update the configuration file through the specified interface, so that a possibility that the switch obtains the correct configuration file is improved, and time for normal starting of the switch is reduced.

In an embodiment, when the switch is controlled to obtain the configuration file from the server through the working interface, the method further includes:

traversing the plurality of interfaces, banning another interface except the working interface in the plurality of interfaces from working, and deleting a default route corresponding to the another interface.

In some embodiments of the present application, the configuration management apparatus implements a function, wherein a parameter is the interface name. When the switch is controlled to obtain the configuration file from the working interface, banning the another interface from working includes: first obtaining interface numbers of all the interfaces; then performing traversing to perform sysctlnet.ipv6.conf. {interface name}.accept_ra=0(banning the RA function of the other interface) on all the other interfaces except the working interface, wherein RA (router advertisement) function is a function of timed sending a router advertisement to a host or the server, and the advertisement includes a working request, network prefix information, and some other flag bit information; and deleting a default route generated by the RA function of the another interface except the working interface.

In the present application, by banning the another interface from continuing to send a task request to a terminal, including disabling the RA function of the another interface and deleting the corresponding default route, the working pressure of the server is alleviated by the configuration management apparatus, and the interference to the switch during obtaining of the configuration file is avoided.

In an embodiment, determining a processing action based on a determining result includes:

when it is determined that the switch is not normally started, labeling the working interface as an invalid interface, performing a lock release operation on the working interface, and after all invalid interfaces are excluded, reselecting the working interface from the plurality of interfaces to perform the lock obtaining operation; or when it is determined that the switch is normally started, canceling labels of all the invalid interfaces, and performing the lock release operation on the working interface.

In some embodiments of the present application, the configuration management apparatus creates a dictionary service, wherein a key is the interface name, and a value (result) is true (correct) or false (wrong). When it is determined that the switch may not be normally started within a period of time, this time range may be set by the user through the configuration management apparatus, the working interface is labeled as an invalid interface, and the configuration management apparatus outputs false, implements a lock release function on the working interface, and after excluding a wrong interface through the dictionary service, reselects the working interface from the other interfaces to implement the lock obtaining function. When the switch is normally started within a period of time, the labels of all the invalid interfaces are canceled, a record in the dictionary service is cleared, and the lock release function is implemented on the working interface.

In the present application, the configuration management apparatus determines whether the switch is normally started to exclude the invalid interface, to ensure that the switch obtains the correct configuration file and is normally started. At the same time, after normal starting, the label of the invalid interface is canceled, and the lock release function is executed on the working interface, to avoid influence on a next configuration update of the switch.

In an embodiment, when it is detected that the switch is still not normally started within a time range set by a user, the labels of all the invalid interfaces are canceled.

In some embodiments of the present application, when the switch is still not normally started after obtaining the configuration within a certain time period set by the user, the configuration management apparatus cancels the labels of all the invalid interfaces.

In some embodiments of the present application, in a long-term configuration obtaining process, a certain invalid interface may have a temporary failure and return to be normal after a period of time. Therefore, the configuration management apparatus may cancel the labels of all the invalid interfaces, and reselect the working interface from all the interfaces to perform the lock obtaining operation.

In an embodiment, before selecting one interface from the plurality of interfaces of the switch as the working interface to perform the lock obtaining operation, the method further includes:

detecting information sent by the server to the switch, and when the information includes a configuration starting instruction, starting to select one interface from the plurality of interfaces as the working interface to perform the lock obtaining operation.

In some embodiments of the present application, the configuration management apparatus registers a hook in the switch. When the switch obtains an announcement issued by the DHCP server, if the announcement includes a content of the option 59, the switch prompts the configuration management apparatus to formally start a working process.

In the present application, the configuration management apparatus may automatically start to work only when the content about the option 59 is detected.

Figure 4:
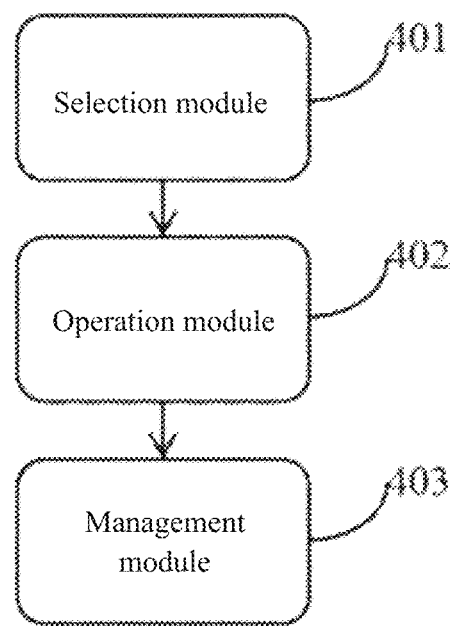
FIG. 4 is a schematic structural diagram of an apparatus for managing switch configuration.

As shown in FIG. 4, an apparatus for managing switch configuration is further provided in the present application. The apparatus includes:

a selection module 401, configured to select interface from a plurality of interfaces of a switch as a working interface to perform a lock obtaining operation to generate an operation result;

an operation module 402, configured to perform a control operation based on the operation result, wherein the control operation includes controlling the switch to obtain a configuration file from a server through the working interface; and a management module 403, configured to, after it is confirmed that the switch completes obtaining the configuration file, determine whether the switch is normally started, and determine a processing action based on a determining result.

In the present application, the apparatus for managing the switch configuration may implement beneficial effects of the foregoing method for managing the switch configuration. Details are not described herein again.

In some embodiments of the present application, the selection module 401 is configured to select, from the plurality of interfaces of the switch, the working interface that successfully obtains a lock, so that the switch obtains the configuration file from the server through the working interface, after the configuration file is completely obtained, whether the switch is normally started is checked to determine a subsequent processing action.

In some embodiments of the present application, the operation module 402 is configured to implement a lock obtaining function, wherein a parameter is an interface name. When there is the lock file in the switch and the specified interface number in the lock file is the working interface number, or there is not the lock file, the working interface certainly successfully implements the lock obtaining function. When the specified interface number in the lock file is not the selected working interface number, the working interface fails to implement the lock obtaining function, and the selection module 401 needs to reselect the working interface.

In some embodiments of the present application, the operation module 402 is further configured to: if the lock obtaining function fails, implement the lock obtaining function on the specified interface of the switch in the lock file.

In some embodiments of the present application, the operation module 402 is further configured to implement a function, wherein a parameter is the interface name. When the switch obtains the configuration from the working interface, banning the another interface from working includes: first obtaining interface numbers of all the interfaces; then performing traversing to perform sysctlnet.ipv6.conf.{interface name}.accept_ra=0(banning the RA function of the other interface) on all the other interfaces except the working interface, wherein RA (router advertisement) function is a function of timed sending a router advertisement to a host or the server, and the advertisement includes a working request, network prefix information, some other flag bit information; and deleting a default route generated by the RA function of the another interface except the working interface.

In some embodiments of the present application, the management module 403 is configured to create a dictionary service, wherein a key is the interface name, and a value (result) is true (correct) or false (wrong). When it is determined that the switch may not be normally started within a period of time, this time range may be set by the user through the server, the working interface is labeled as an invalid interface, and the operation module 402 outputs false, and implements a lock release function on the working interface, and after excluding a wrong interface through the dictionary service, the selection module 401 reselects the working interface from the other interfaces to implement the lock obtaining function. When the switch is normally started within a period of time, the management module 403 cancels the labels of all the invalid interfaces, and clears a record in the dictionary service, and the operation module 402 implements the lock release function on the working interface.

In some embodiments of the present application, the management module 403 is further configured to record a time parameter set by a user. When the switch is still not normally started after obtaining the configuration within specified time, the management module 403 is further configured to cancel the labels of all the invalid interfaces in the dictionary service.

In some embodiments of the present application, the management module 403 is further configured to register a hook in the switch. When the switch obtains an announcement issued by the DHCP server, if the announcement includes a content of the option 59, the switch prompts the management module 403 to start starting the selection module 401.

In some embodiments of the present application, the apparatus for managing the switch configuration corresponds to the method for managing the switch configuration. For beneficial effects that may be implemented by the apparatus for managing the switch configuration, reference is made to the method for managing the switch configuration. Details are not described herein again.

An electronic device is further provided by the present application, including:

one or more processors; and a memory associated with the one or more processors, wherein the memory is configured to store program instructions; and when the program instructions are read and executed by the one or more processors, the method for managing the switch configuration is performed. In some embodiments of the present application, for an execution process and technical effects that may be implemented, reference is made to the descriptions for the method for managing the switch configuration, which are not described herein again.

Figure 5:
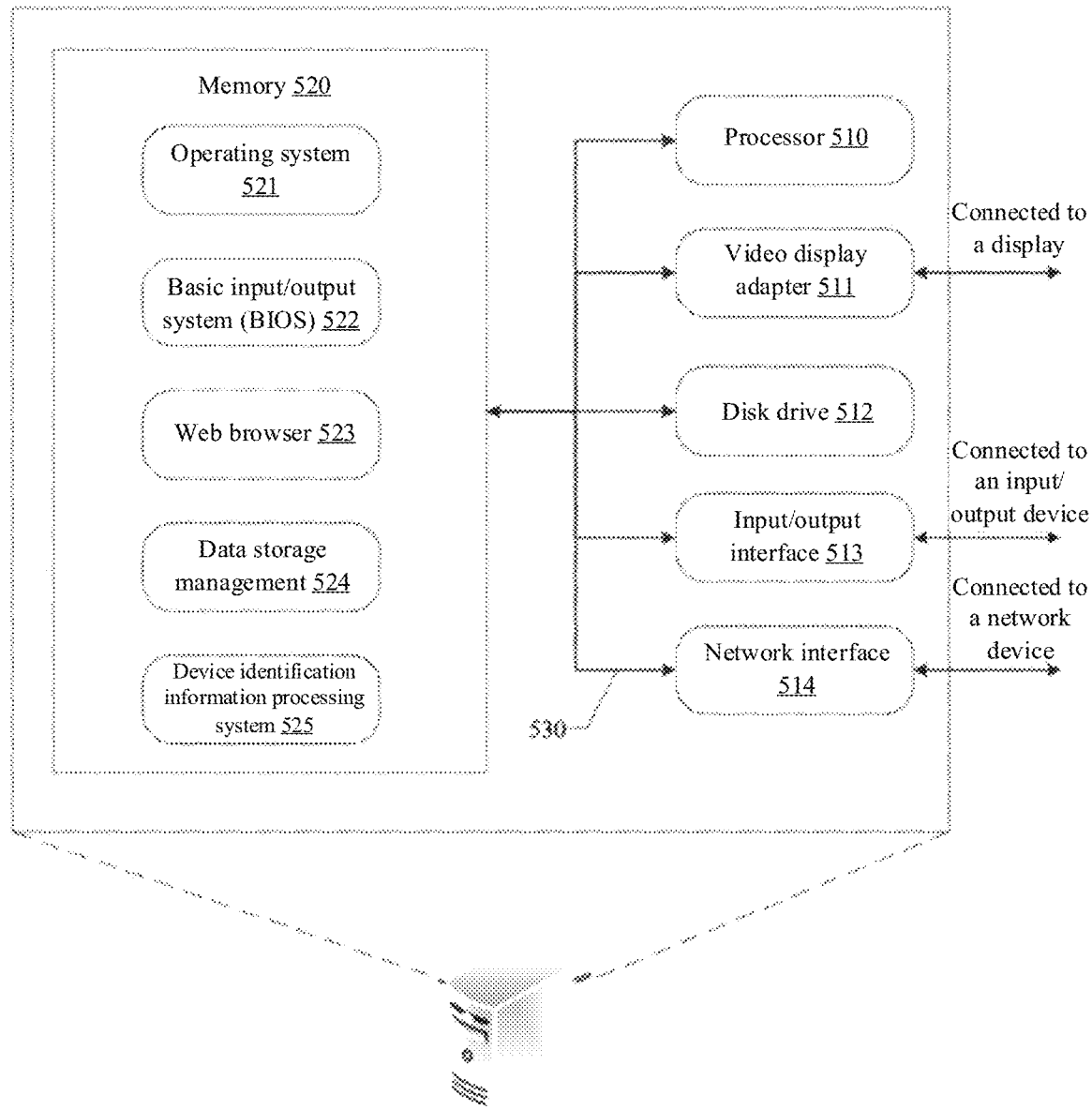
FIG. 5 is an architecture diagram of an electronic device according to some embodiments of the present application.

FIG. 5 exemplarily shows a system architecture of the electronic device, including a processor 510, a video display adapter 511, a disk drive 512, an input/output interface 513, a network interface 515, and a memory 520. The processor 510, the video display adapter 511, the disk drive 512, the input/output interface 513, the network interface 515, and the memory 520 may be in communication connection through a communication bus 530.

In some embodiments of the present application, the processor 510 may be implemented by a general-purpose central processing unit (CPU), a microprocessor, an application specific integrated circuit (ASIC), one or more integrated circuits, or the like, and is configured to execute a related program, to implement the technical solutions provided in the present application.

In some embodiments of the present application, the memory 520 may be implemented in a form of a read only memory (ROM), a random access memory (RAM), a static storage device, a dynamic storage device, or the like. The memory 520 may store an operating system 521 configured to control a computer system to run and a basic input output system (BIOS) configured to control a low-level operation of the computer system. In addition, the memory 520 may further store a web browser 523, a data storage management system 524, a device identification information processing system 525, and the like. The device identification information processing system 525 may be an application program that implements operations in the foregoing steps in the embodiments of the present application. In summary, when the technical solutions provided in the present application are implemented via software or firmware, related program code is stored in the memory 520 and invoked and executed by the processor 510.

In some embodiments of the present application, the input/output interface 513 is configured to be connected to an input/output module, to implement information input and output. The input/output module may be configured in the device as a component (not shown in this figure), or may be externally connected to a device to provide a corresponding function. An input device may include a keyboard, a mouse, a touchscreen, a microphone, various sensors, and the like. An output device may include a display, a speaker, a vibrator, an indicator lamp, and the like.

In some embodiments of the present application, the network interface 515 is configured to be connected to a communication module (not shown in this figure), to implement communication interaction between this device and another device. The communication module may implement communication in a wired manner (for example, a USB or a network cable), or may implement communication in a wireless manner (for example, a mobile network, wireless fidelity (WiFi), or Bluetooth).

In some embodiments of the present application, the bus 530 include a pathway, to transmit information between the components (for example, the processor 510, the video display adapter 511, the disk drive 512, the input/output interface 513, the network interface 515, and the memory 520) of the device.

It should be noted that although only the processor 510, the video display adapter 511, the disk drive 512, the input/output interface 513, the network interface 515, the memory 520, the bus 530, and the like of the device are shown, in an implementation process, the device may further include other components necessary for implementing normal running. In addition, it may be understood by a person skilled in the art that the device may alternatively include only components necessary for implementing the solutions in the present application, rather than include all the components shown in this figure.

A computer program product in the present application includes a computer program carried in a computer-readable medium. The computer program includes program code for performing a method shown in the flowchart. In this embodiment, the computer program may be downloaded from a network and installed through a communication apparatus, installed from a memory, or installed from a ROM. When the computer program is executed by a processor, the functions defined in the method in some embodiments of the present application are executed.

It should be noted that the computer-readable medium in some embodiments of the present application may be a computer-readable signal medium, a non-transitory computer-readable storage medium, or any combination thereof. The non-transitory computer-readable storage medium may be but is not limited to, for example, an electrical, magnetic, optical, electromagnetic, infrared, or semiconductor system, an apparatus, or a device, or any combination thereof. More examples of the non-transitory computer-readable storage medium may include but are not limited to an electrical connection with one or more wires, a portable computer diskette, a hard disk, a RAM, a ROM, an erasable programmable ROM (EPROM) (or a flash memory), an optical fiber, a portable compact disc read-only memory (CD-ROM), an optical storage device, a magnetic storage device, or any suitable combination thereof.

In some embodiments of the present application, the non-transitory computer-readable storage medium may be any physical medium containing or storing a program, and the program may be used by or in combination with an instruction execution system, apparatus, or device. In the embodiment of the present application, the computer-readable signal medium may include a data signal that is propagated in baseband or as a part of a carrier wave, in which computer-readable program code is carried. Such a propagated signal may be in a variety of forms, including but not limited to, an electromagnetic signal, an optical signal, or any suitable combination thereof. The computer-readable signal medium may also be any computer-readable medium except for the non-transitory computer-readable storage medium, and the computer-readable signal medium may send, propagate, or transmit a program for use by or in combination with an instruction execution system, an apparatus, or a device. The program code contained in the computer-readable medium may be transmitted by using any suitable medium, including but not limited to an electrical wire, an optical cable, radio frequency (RF), or any suitable combination thereof.

In some embodiments of the present application, the computer-readable medium may be included in the server, or may exist alone and is not assembled in the server. The computer-readable medium carries one or more programs. When the one or more programs are executed by the server, the server is enabled to: obtain a frame rate of an application on a terminal in response to detecting that a peripheral mode of the terminal is not activated; determined, when the frame rate satisfies a screen-off condition, whether a customer is obtaining screen information of the terminal; and in response to a determining result being that the consumer does not obtain the screen information of the terminal, control a screen to enter an immediate dimming mode.

In some embodiments of the present application, computer program code for performing operations in some embodiments of the present application may be compiled by using one or more programming languages or a combination thereof. The programming languages include object-oriented programming languages such as Java, Smalltalk, and C++, and also include conventional procedural programming languages such as "C" language or similar programming languages. The program code may be executed entirely on a computer of the customer, partly on a computer of a customer, as a stand-alone software package, partly on a computer of a customer and partly on a remote computer, or entirely on a remote computer or server. In situations involving a remote computer, the remote computer may be connected to the computer of the customer through any kind of network, including a local area network (LAN) or a wide area network (WAN), or it may be connected to an external computer (for example, connected by using an Internet service provider through the Internet).

The embodiments in this specification are all described in a progressive manner. For same or similar parts in the embodiments, mutual reference may be made. Each embodiment focuses what is different from other embodiments. Especially, a system or a system embodiment is basically similar to the method embodiment, and therefore is described briefly. For related parts, reference may be made to partial descriptions in the method embodiment. The described system and system embodiment are merely examples. The units described as separate parts may or may not be physically separated. Parts shown as units may or may not be physical modules, and may be located at one location, or may be distributed on a plurality of network units. Some or all of the modules may be selected based on actual requirements to implement the objectives of the solutions in some embodiments of the present application. A person of ordinary skill in the art may understand and implement the embodiments of the present application without creative efforts.

The method and the apparatus for managing switch configuration, the electronic device, and the storage medium provided in the present application are described in detail above. The principle and implementation of the present application are described herein through examples. The descriptions about the embodiments are merely provided to help understand the method and core ideas of the present application. In addition, a person of ordinary skill in the art may make variations and modifications to the present application in terms of the implementations and application scopes according to the ideas of the present application. Therefore, the content of this specification shall not be construed as a limitation on the present application.

The invention claimed is:

1. A method for managing switch configuration, applied to a configuration management apparatus, comprising:
    selecting one interface from a plurality of interfaces of a switch as a working interface to perform a lock obtaining operation to generate an operation result;
    performing a control operation based on the operation result, wherein the control operation comprises controlling the switch to obtain a configuration file from a server through the working interface; and
    after it is confirmed that the switch completes obtaining the configuration file, determining whether the switch is normally started, and determining a processing action based on a determining result.

2. The method according to claim 1, wherein the operation result comprises a lock obtaining success and a lock obtaining failure, and selecting one interface from the plurality of interfaces of the switch as the working interface to perform the lock obtaining operation to generate the operation result comprises:
    detecting whether there is a lock file in the switch, and in response to there being not the lock file, writing a working interface number of the working interface to the lock file to generate a new lock file, and generating the operation result indicating the lock obtaining success; or
    in response to there being the lock file, and a specified interface number in the lock file is the working interface number, generating the operation result indicating the lock obtaining success; or
    in response to there being the lock file, and the specified interface number in the lock file is not the working interface number, generating the operation result indicating the lock obtaining failure.

3. The method according to claim 2, wherein detecting whether there is a lock file in the switch comprises:
    performing a lock obtaining function operation on the working interface of the switch, wherein a parameter of a lock obtaining function is an interface name of the working interface.

4. The method according to claim 3, wherein generating the operation result indicating the lock obtaining success comprises:
   in response to successfully performing the lock obtaining function operation on the working interface, generating the operation result indicating the lock obtaining success.

5. The method according to claim 3, wherein generating the operation result indicating the lock obtaining failure comprises:
   in response to failing to perform the lock obtaining function operation on the working interface, generating the operation result indicating the lock obtaining failure.

6. The method according to claim 2, wherein performing the control operation based on the operation result comprises:
   in response to the lock obtaining success, controlling the switch to obtain the configuration file from the server through the working interface; and
   in response to the lock obtaining failure, selecting the specified interface corresponding to the specified interface number as the working interface to perform the lock obtaining operation.

7. The method according to claim 6, wherein after in response to the lock obtaining success, controlling the switch to obtain the configuration file from the server through the working interface, the method further comprises:
   controlling, based on the configuration file, the switch to start a configuration update.

8. The method according to claim 6, wherein in response to controlling the switch to obtain the configuration file from the server through the working interface, the method further comprises:
   traversing the plurality of interfaces, banning another interface except the working interface in the plurality of interfaces from working, and deleting a default route corresponding to the another interface.

9. The method according to claim 8, wherein traversing the plurality of interfaces, banning the another interface except the working interface in the plurality of interfaces from working, and deleting the default route corresponding to the another interface comprises:
   obtaining interface numbers of the plurality of interfaces; and
   traversing the plurality of interfaces, banning the another interface except the working interface in the plurality of interfaces from sending a task request to a terminal, and deleting the default route corresponding to the another interface.

10. The method according to claim 9, wherein traversing the plurality of interfaces, banning the another interface except the working interface in the plurality of interfaces from sending the task request to the terminal, and deleting the default route corresponding to the another interface comprises:
    traversing the plurality of interfaces, banning the another interface except the working interface in the plurality of interfaces from executing an Internet protocol disabling instruction and a router advertisement function disabling instruction, and deleting the default route corresponding to the another interface.

11. The method according to claim 8, wherein the default route is generated by a router advertisement function of the another interface except the working interface, and the router advertisement function is a function of timed sending a router advertisement to a host or the server.

12. The method according to claim 1, wherein determining the processing action based on the determining result comprises:
    in response to the switch being not normally started, labeling the working interface as an invalid interface, performing a lock release operation on the working interface, and after all invalid interfaces are excluded, reselecting the working interface from the plurality of interfaces to perform the lock obtaining operation; and
    in response to the switch being normally started, canceling labels of all the invalid interfaces, and performing the lock release operation on the working interface.

13. The method according to claim 12, wherein before determining the processing action based on the determining result, the method further comprises:
    creating a dictionary service, wherein a dictionary comprises an interface name of the working interface and the determining result.

14. The method according to claim 13, wherein the determining result comprises a false result, and in response to the switch being not normally started, labeling the working interface as the invalid interface, performing the lock release operation on the working interface, and after all invalid interfaces are excluded, reselecting the working interface from the plurality of interfaces to perform the lock obtaining operation comprises:
    in response to the switch being not normally started, labeling the working interface as the invalid interface, outputting the false result, and performing the lock release operation on the working interface; and
    excluding all the invalid interfaces by using the dictionary service, and then reselecting the working interface from the plurality of interfaces to perform the lock obtaining operation.

15. The method according to claim 14, wherein performing the lock release operation on the working interface comprises:
    performing a lock release function operation on the working interface.

16. The method according to claim 13, wherein the determining result comprises a true result, and in response to the switch being normally started, canceling the labels of all the invalid interfaces, and performing the lock release operation on the working interface comprises:
    in response to the switch being normally started, canceling the labels of all the invalid interfaces, clearing a record in the dictionary service, and performing the lock release operation on the working interface.

17. The method according to claim 12, wherein in response to the switch being still not normally started within a time range set by a user, the labels of all the invalid interfaces are canceled.

18. The method according to claim 1, wherein before selecting one interface from the plurality of interfaces of the switch as the working interface to perform the lock obtaining operation, the method further comprises:
    detecting information sent by the server to the switch, and in response to the information comprising a configuration starting instruction, starting to select one interface from the plurality of interfaces as the working interface to perform the lock obtaining operation.

19. An electronic device, comprising:
    one or more processors; and a memory associated with the one or more processors, wherein the memory is configured to store program instructions; and in response to the program instructions being read and executed by the one or more processors, the method according to claim 1 is performed.

20. A non-transitory computer storage medium storing a computer program thereon, wherein in response to the program being executed by a processor, the method according to claim 1 is implemented.

* * * * *